US008800027B1

(12) United States Patent
Ackerman

(10) Patent No.: US 8,800,027 B1
(45) Date of Patent: Aug. 5, 2014

(54) AUTHENTICATION USING PRIVACY PROTECTED PERSONALLY IDENTIFIABLE INFORMATION

(75) Inventor: Karl Ackerman, Topsfield, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/615,839

(22) Filed: Sep. 14, 2012

(51) Int. Cl.
*G06F 12/14* (2006.01)
*G06F 21/31* (2013.01)
*H04L 9/08* (2006.01)
*H04L 29/06* (2006.01)

(52) U.S. Cl.
CPC ........ *G06F 21/31* (2013.01); *G06F 2221/2141* (2013.01); *H04L 9/0872* (2013.01); *H04L 63/08* (2013.01)
USPC ............. 726/17; 701/408; 380/250; 380/258; 726/21; 705/42; 705/70

(58) Field of Classification Search
None
See application file for complete search history.

(56) References Cited

U.S. PATENT DOCUMENTS

| 6,925,181 | B2 * | 8/2005 | Kohn et al. .................... 380/213 |
| 8,037,512 | B2 | 10/2011 | Wright et al. |
| 8,140,502 | B2 | 3/2012 | Francis et al. |
| 8,212,658 | B2 * | 7/2012 | Monroe .................... 340/426.19 |
| 8,407,759 | B1 * | 3/2013 | Sotos et al. ........................ 726/1 |
| 8,433,287 | B2 | 4/2013 | Su |
| 8,479,299 | B1 * | 7/2013 | Cooley ............................ 726/26 |
| 8,571,931 | B2 | 10/2013 | Riedl et al. |
| 2006/0184538 | A1 * | 8/2006 | Randall et al. ................... 707/10 |
| 2011/0040972 | A1 | 2/2011 | Attia et al. |
| 2012/0151223 | A1 | 6/2012 | Conde Marques et al. |
| 2012/0203663 | A1 * | 8/2012 | Sinclair et al. ............. 705/26.41 |
| 2012/0292388 | A1 * | 11/2012 | Hernandez ..................... 235/379 |
| 2013/0151410 | A1 * | 6/2013 | Babi ............................... 705/44 |

OTHER PUBLICATIONS

Wikipedia contributors. "Velocity." Wikipedia, The Free Encyclopedia. Wikipedia, The Free Encyclopedia, Jul. 11, 2013. Web. Jul. 24, 2013, from http://en.wikipedia.org/w/index.php?title=Velocity&oldid=447517283.*
Wikipedia contributors. "Inverse trigonometric functions." Wikipedia, The Free Encyclopedia. Wikipedia, The Free Encyclopedia, Aug. 29, 2012. Web. Dec. 16, 2013, from en.wikipedia.org/w/index.php?title=inverse_trigonometric_functions&oldid=509810030.*

* cited by examiner

*Primary Examiner* — Saleh Najjar
*Assistant Examiner* — Jason Plotkin
(74) *Attorney, Agent, or Firm* — BainwoodHuang

(57) ABSTRACT

An authentication method and system provides for a user requesting authentication where the authentication request includes Personally Identifiable Information (PPI) such as geolocation data. The user's device requesting authentication alters or encrypts the PII in order to prevent the PII's unintentional discovery by third parties or to comply with jurisdictional requirements for the safeguarding of PII. The receiving party saves the altered or encrypted PII for later use. In order to use the PII and perform calculations for authentication, the receiving party requests a trusted third party with knowledge of the methodology or key used to alter or encrypt the PII to perform calculations on the original values of the PII without saving the PII. The trusted third party returns a computed value to the receiving party where it is used to determine whether the user will be authenticated.

18 Claims, 6 Drawing Sheets

500

---

501 RECEIVE FROM AN APPLICATION PROVIDER, IN RESPONSE TO A REQUEST FOR AUTHENTICATION FROM THE USER DEVICE, THE REQUEST INCLUDES AN ALTERED CURRENT PII AND AN ALTERED PREVIOUS PII, THE AN APPLICATION PROVIDER UNABLE TO REPRODUCE A CURRENT PII AND A PREVIOUS PII

↓

503 COMPUTE AN AUTHENTICATION VALUE (I.E. VELOCITY) BASED UPON THE ALTERED CURRENT PII AND THE ALTERED PREVIOUS PII

↓

505 FORWARD THE AUTHENTICATION VALUE TO THE APPLICATION PROVIDER, THE APPLICATION PROVIDER AUTHENTICATING THE USER DEVICE BASED UPON THE AUTHENTICATION VALUE (I.E. VELOCITY)

601 PRODUCE PERSONALLY IDENTIFIABLE INFORMATION IN RESPONSE TO A USER REQUESTING AUTHENTICATION TO USE AN APPLICATION OF AN APPLICATION PROVIDER

↓

603 ALTER THE PII TO OBSCURE THE PII USING AN OBSCURES VALUE UNIQUE TO EACH USER DEVICE

↓

605 TRANSMIT A REQUEST FOR AUTHENTICATION INCLUDES THE ALTERED PII TO AN APPLICATION PROVIDER, THE APPLICATION PROVIDER STORING THE ALTERED PII WITH A PREVIOUSLY STORED INSTANCE OF THE ALTERED PII, THE APPLICATION PROVIDER UNABLE TO REPRODUCE THE PII FROM THE ALTERED PII, THE APPLICATION PROVIDER REQUESTS A TRUSTED DEVICE TO PRODUCE AN AUTHENTICATION VALUE BASED ON THE ALTERED PII AND THE PREVIOUSLY STORED INSTANCE OF THE ALTERED PII

↓

607 RECEIVE FROM THE APPLICATION PROVIDER AN INDICATION OF AUTHENTICATION, THE APPLICATION PROVIDER DETERMINING AUTHENTICATION BASED UPON AN AUTHENTICATION VALUE (I.E. EVLOCITY) CALCULATED ON THE TRUSTED DEVICE

FIG. 6

AUTHENTICATION USING PRIVACY PROTECTED PERSONALLY IDENTIFIABLE INFORMATION

BACKGROUND

Some authentication systems use geolocation data to make a determination if a particular user is a fraud. For example, consider a client X of a Local Bank who logs into his account using his smart phone at 7:00 AM to transfer funds to another account. As part of his login sequence, a client application on the smart phone requests geolocation data from the smartphone; the smart phone then provides geolocation data to an application server at the Local Bank. The server would perform a search of a database and find that client X is in New York City within 3 meters of the location at which he logged in to his account using the smart phone 24 hours ago. The server would then determine that the risk of fraud is low as the user is in the location at which he normally performs such a function and at a time he normally performs such a function.

Suppose that, thirty-five minutes later an unknown user attempts to log into client X's account at Local Bank. Suppose further that the smart phone provides geolocation data indicating it is in Los Angeles rather than New York City. The server would then determine that client X could not travel from New York City to Los Angeles in thirty-five minutes. The server would also determine that the risk of fraud is high because the speed at which the client would have traveled is beyond a limit set by Local Bank. When the server determines that the risk of fraud is elevated, additional authentication steps are performed.

A conventional authentication system used by Local Bank stores the geolocation data for later use in the database in order to calculate the speed of the user on his next attempt to log into the banking application.

SUMMARY

Unfortunately, there are deficiencies with the above-described conventional authentication system. In particular, the Local Bank server is required to know the client's geolocation in order to be able to determine the speed at which the client travels. If Local Bank's server were compromised by an intruder, client X's geolocation information would be compromised. The failure to protect the geolocation data could subject the Local Bank to civil liability.

In many cases, geolocation data is considered Personally Identifiable Information (PII). PII is information that is used to uniquely identify an individual requesting access to a site, device or application. In some jurisdictions, it is illegal for a private institution such as Local Bank to store PII. As such, not only does the compromising of client X's geolocation data subject Local Bank to civil liability, the mere storing of the geolocation data may subject Local Bank to criminal liability.

In contrast to the above described conventional authentication system which stores PII and leaves Local Bank open to liability, an improved technique involves altering PII produced thereon, such as geolocation data, via encryption or offsetting to obscure the PII's true value and forwards the altered PII to a server. For example, to perform authentication the server requests a trusted third party perform the function required to authenticate the user. The trusted third party decrypts the actual value of the geolocation data or other PII and performs calculations that can authenticate the user from his geolocation data and returns the result of the calculation to the server. The server can then choose to authenticate the user or prevent authentication based upon the value returned by the trusted third party. The server does not store or at any time during authentication have access to the true value of the PII.

Advantageously, the improved technique prevents the detection of PII by unwanted parties, including the application provider while providing compliance with privacy laws of many jurisdictions.

One embodiment of the improved technique is directed to a method of authenticating a user using a user device. An application provider receives a request for authentication from a user device, the request includes an altered current personally identifiable information PII and an altered previous PII. The application provider being unable to reproduce a current PII and a previous PII from the altered current and the altered previous PII. The application provider computes an authentication value based upon the altered current PII and the altered previous PII and forwards the authentication value to the application provider, the application provider authenticates the user device based upon the authentication value.

In another embodiment of the invention is directed to a method executed on a user device, where the user device produces PII in response to the user requesting authentication to use an application of an application provider. Next the user device alters the PII to obscure the PII using an obscuring value unique to each user device. Then the user device transmits a request for authentication including the altered PII to an application provider, the application provider stores the altered PII with a previously stored instance of the altered PII, the application provider unable to reproduce the PII from the altered PII. The application provider requests a trusted device to produce an authentication value based on the altered PII and the previously stored instance of the altered PII. The user device receives from the application provider an indication of authentication, the application provider determining authentication based upon an authentication value calculated on the trusted device.

In another embodiment of the invention is directed to a system for authentication. The system includes an application provider that receives from a user device, a request for authentication. The request for authentication includes an altered current PII. The application provider also stores the altered current PII with altered previous PII previously transmitted from the user device. The application provider is unable to reproduce a current PII from the altered current PII, thereby preventing its use by untrusted third parties. The system further includes a trusted party that receives from the application provider, the altered current PII and the altered previous PII. The trusted party computes an authentication value based on the altered current PII and the altered previous PII and returns the authentication value to the application provider. The application provider then authenticates the user based upon the authentication value returned by the trusted party.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is a flowchart illustrating a method of a trusted party supporting authentication of a user device associated with a user.

FIG. 6 is a flowchart illustrating a second method of user device requesting authentication of a user.

DETAILED DESCRIPTION

An improved technique provides a method which includes a user device that alters PII produced thereon, such as geolocation data, via encryption or offsetting to obscure the PII's true value and forwards the altered PII to a server. In order to perform authentication the server requests a trusted third party perform the function required to authenticate the user. The trusted third party decrypts the actual value of the geolocation data or other PII and performs calculations that can authenticate the user from his geolocation data and returns the result of the calculation to the server. The server can then choose to authenticate the user or prevent authentication based upon the value returned by the trusted third party. The server does not store or at any time during authentication have access to the true value of the PII.

Figure 1:
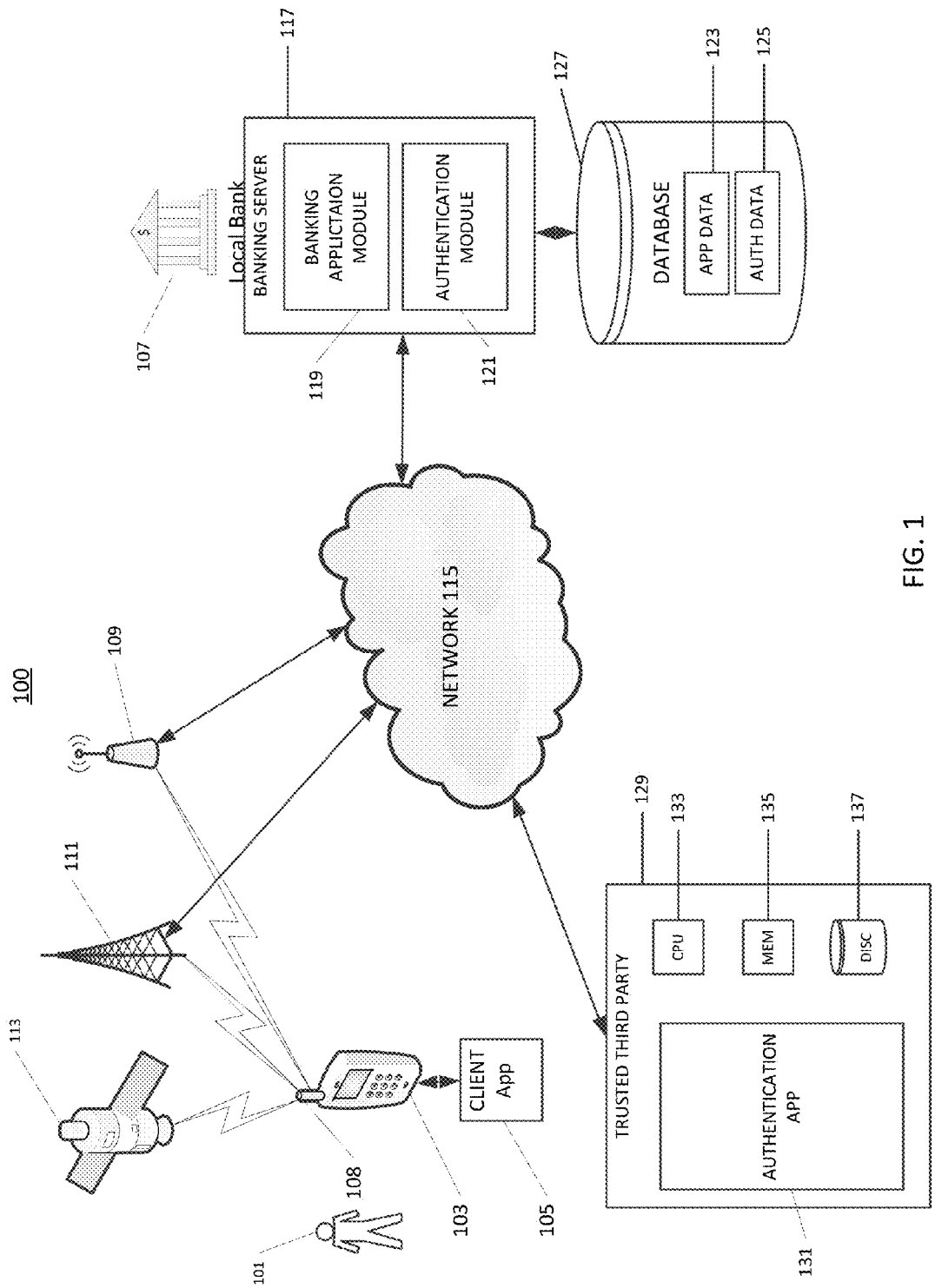
FIG. 1 is a schematic diagram illustrating an example system for authentication.

FIG. 1 is a schematic diagram illustrating a system 100 for authentication of a user 101. User 101 has a user device 103, such as smart phone, tablet or other end user device. The user device 101 includes end user applications, including banking client application 105 provided by Local Bank 107. The user device 101 also includes an antenna 108 that allows the device to communicate with a wireless hotspot 109, cell towers 111, and global positioning system (GPS) satellites 113.

Wireless hotspot 109 and cell tower 111 allow the user device 103 to communicate across a network 115, such as the internet, to contact a server 117 of Local Bank 107. Server 117 has banking application 119 and authentication module 121 for processing banking transactions and authenticating users prior to allowing the user access to the banking application 119. Server 117 stores the application data 123 and authentication data 125 in database 127.

Trusted third party 129 is connected via network 115 to the server 117 of Local Bank 107. Trusted third party 129 contains authentication software 131 for decrypting PII and performing calculations on the decrypted PII. Authentication software 131 is stored on disc 137 and loaded into memory 135 and executed by processor 133.

User 101 begins an authentication sequence to allow performance of banking transactions using banking client application 105 on user device 103. User device 103 connects to server 117 at Local Bank 107 to enable the performing of the banking transaction, such as transferring funds. The user enters a password, one time password, answers challenge questions or provides some biometric data through a device (not shown) attached to user device 103. The user device 103 further requests geolocation data. Geolocation in internet and computer terms is a location gleaned by associating a geographic location with the Internet Protocol (IP) address, MAC address, RFID scan, Wi-Fi connection location, or device GPS coordinates, cell-phone tower triangulation coordinates or user-disclosed location information. The geolocation data is received via antenna 108 from GPS satellites 113.

The geolocation data or other PII generated by the user device 103 is encrypted or otherwise obscured using a key or offset unique to the user device 103. The encryption or obscuring is used to alter the PII and make it un-reproducible by any device that does not have knowledge of the key or offset. The altered PII is transmitted to the server 117 of Local Bank 107, where the server 117 stores the altered PII in the database 127 in the authentication data 125 area. Server 117 cannot reproduce the PII from the altered PII stored in database 127. The database 127 also stores previous altered PII from previous attempts to log on to the server 117 from the user device 103.

The banking application 119 on server 117 forwards the altered PII and previous altered PII stored in the database 127 to the trusted third party 129. Trusted third party 129 uses authentication software 131 to decrypt the altered PII and the previous altered PII to reproduce the original values of the altered PII and the previous altered PII. The PII is geolocation data, the authentication software 131 determines from the time and location of the PII and the previous PII were produced at and returns the time and distance between the two geolocations (i.e. velocity) as an authentication value. The trusted third party 129 returns the authentication value to the banking server 117 where the authentication module 121 makes the determination if the authentication value (i.e. velocity) is acceptable for user 101. The authentication module 119 authenticates user 101, if the authentication value is within a predefined velocity. The authentication of user 101 by authentication module 121 allows the client application 105 of the user device 103 to communicate with banking module 119 across the network 115.

Figure 2:
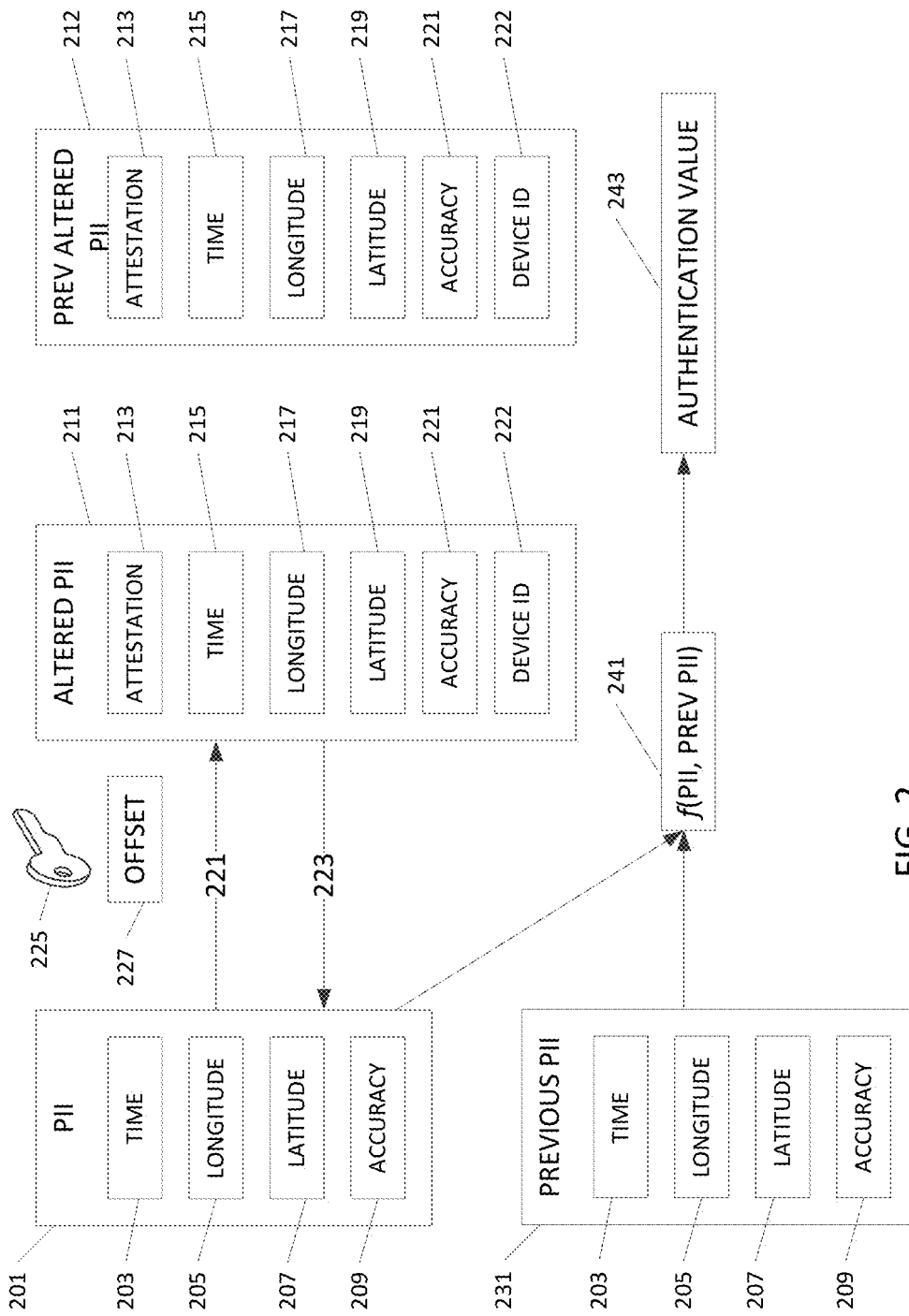
FIG. 2 is a schematic drawing illustrating PII altered and reproduced to calculate an authentication value.

FIG. 2 is a schematic drawing illustrating PII altered and reproduced to calculate an authentication value. User device 103 produces PII 201. The PII 201 includes a time 203 indicating when the geolocation was generated, a longitude 205 of the user device 103, a latitude 207 of the user device 103 and accuracy 209 of the user device 103 measuring geolocation. It will be understood that different types of devices or methods more accurately determine geolocation than other devices or methods. For example, it is commonly understood that determining geolocation by triangulating locations from multiple cell towers 111 will not produce as accurate a geolocation as produced by GPS satellites 113. Therefore, each device or method, cell tower 111 or GPS Satellite 113 will produce a different accuracy 209.

The user device 103 produces the altered PII 211 using either an encryption key 225 or offset 227 to obscure the actual value. In the case of geolocation data, the offset 227, for example, alters the longitude and latitude to always indicate 3500 miles to the north east of the user devices 103's current location. The user device 103 produces the altered PII 211 which includes an encryption attestation 213, time 215, altered longitude, altered latitude 219, altered accuracy 221 and a device id 222 of the user device 103. It will be understood that the previous altered PII 212 will contain the same elements as the altered PII 211, where only the value of the elements changes by time and location. Further, the previous altered PII 212 are the altered PII 211 of previous attempts to authenticate the user 101 on device 103.

The server 117 stores only the altered PII 211 or the previous altered PII 212 in database 127, preventing any untrusted person gaining access to the server 117 being able to reproduce the altered PII 211. Therefore, the altered PII 211 is without value to the untrusted person.

The server 117, using the authentication module 121, forwards the altered PII 211 and the previous altered PII 212 to the trusted third party 129. The authentication application 131 decrypts 223 the altered PII 211 and the previous altered PII 212 using the decryption key 225 to reproduce the PII 201 and previous PII 231. The authentication application 131 then calculates 241 an authentication value 243 by determining the velocity between the PII 201 and the previous PII 231.

It will be understood that where an offset 227 uses a static value, it may not be necessary to reproduce the original PII 201 since both the altered PII 211 and previous altered PII 212 have been altered by the same amount. The calculation of velocity will work on the altered values as well as the unaltered values. It should be understood, when a constant offset is used, the server 117 does not need to use a trusted third party or the user device to determine the distance/time information or velocity. This can be done on the server 117 directly as both the value of the altered PII 211 and previous altered PII 212 are offset by the same amount.

Alternatively, a hybrid of the offset 227 and encryption may be used. The user device when altering the PII 201 generates a distance and direction modification value from a shared secret with a trusted third party 129. The user device 103 could leverage a simple time based one-time password (OTP) generated by a server (not shown) and stored in each of the user device 103 and the trusted third party 129. The client application 105 will determine the current OTP value for the given time and algorithmically convert the OTP value into a distance and direction. For example, a 6 digit OTP token could use the first four bits of the OTP value to determine N, S, E or West and the remaining 15 bits of data could represent a distance in meters. The distance and direction is used to alter longitude 205 and latitude 207 to produce longitude 217 and latitude 219.

The server 117 would forward the altered PII 211 and previous altered PII 212 to the trusted third party 129. The trusted third party 129 uses an OTP for the time 203 and the PII 201 and previous PII 231. The trusted third party 129, in order to get back the original values of the altered PII 201 and the previous altered PII, applies the OTP by subtracting the distance in the last fifteen bits of the OTP in a direction a 180° from the direction indicated in the first 4 bits of the OTP. It will be understood that the OTP is different for each of the altered PII 211 and previous altered PII 212 as each is generated at a different time.

Figure 3:
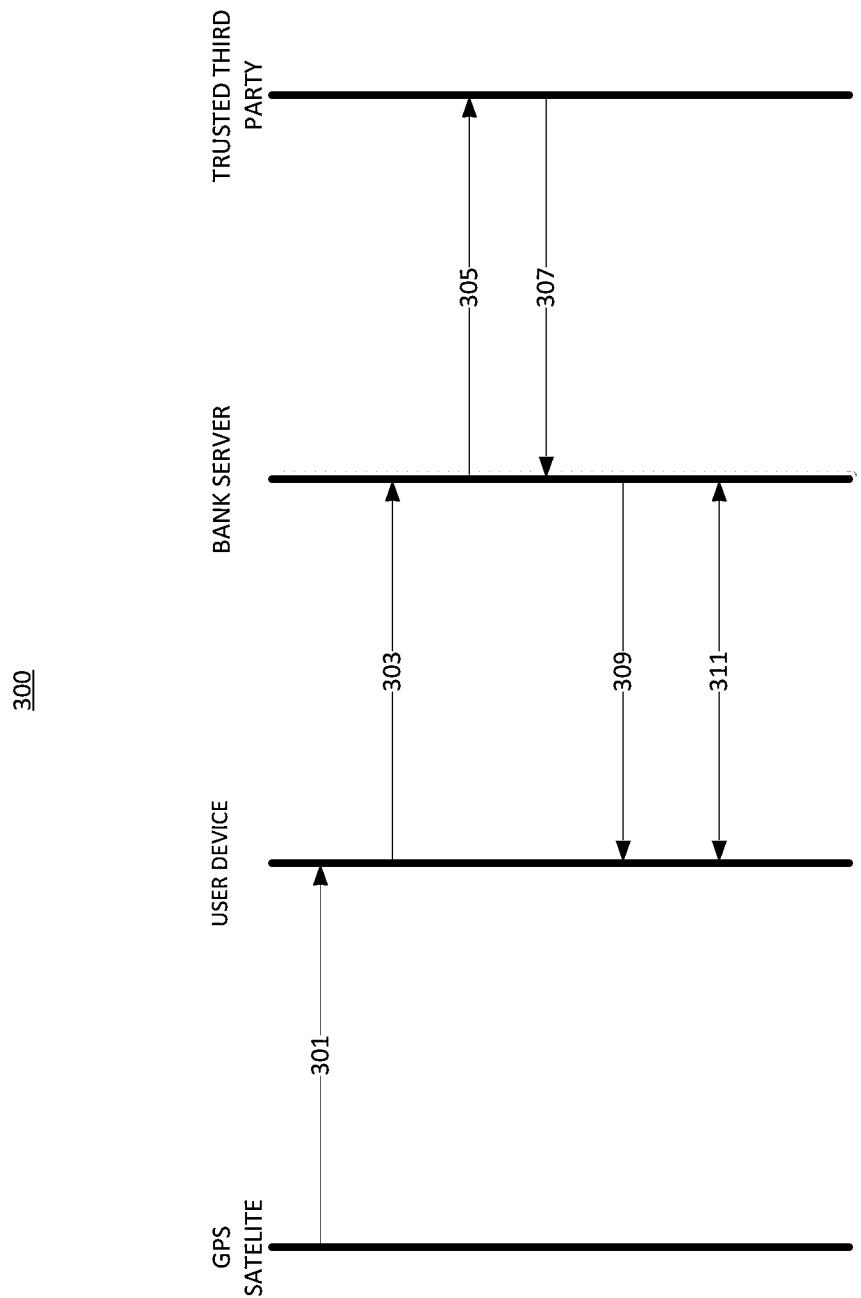
FIG. 3 is a flow diagram illustrating the creation and use of a geolocation data using a trusted third party to decrypt the PII and determine an authentication value.

FIG. 3 is a flow diagram 300 of an example creation and use of PII 201 using a trusted third party to decrypt the altered PII 211 and determine an authentication value 243. The GPS satellites 113 transmit data 301 used to triangulate a geolocation including longitude 205 and latitude 207 of the user device 103. The time 203 and accuracy 209 are known to the end user device, which encrypts the PII 201 to obscure the value and forwards 303 the altered PII 211 to the server 117 at Local Bank 107 requesting authentication. The server 117 stores the altered PII in the database 127 and then forwards 305 the altered PII 211 and previous altered PII 212 to the trusted third party 129 where the authentication application 131 decrypts the altered PII 211 and previous altered PII 212 to produce the PII 201 and the previous PII 231. The authentication app 131 on the trusted third party 129 produces 241 an authentication value 243. The trusted third party 129 forwards 307 the authentication value 243 (i.e. velocity) to the server 117 where the authentication module 121 compares the authentication value 243 to a predefined value. The server 117 of the bank 107 determines that authentication value is within a predefined limit the authentication is forwarded 309 to the user device 103 and banking transactions 311 are allowed between user device 103 and server 103.

Figure 4:
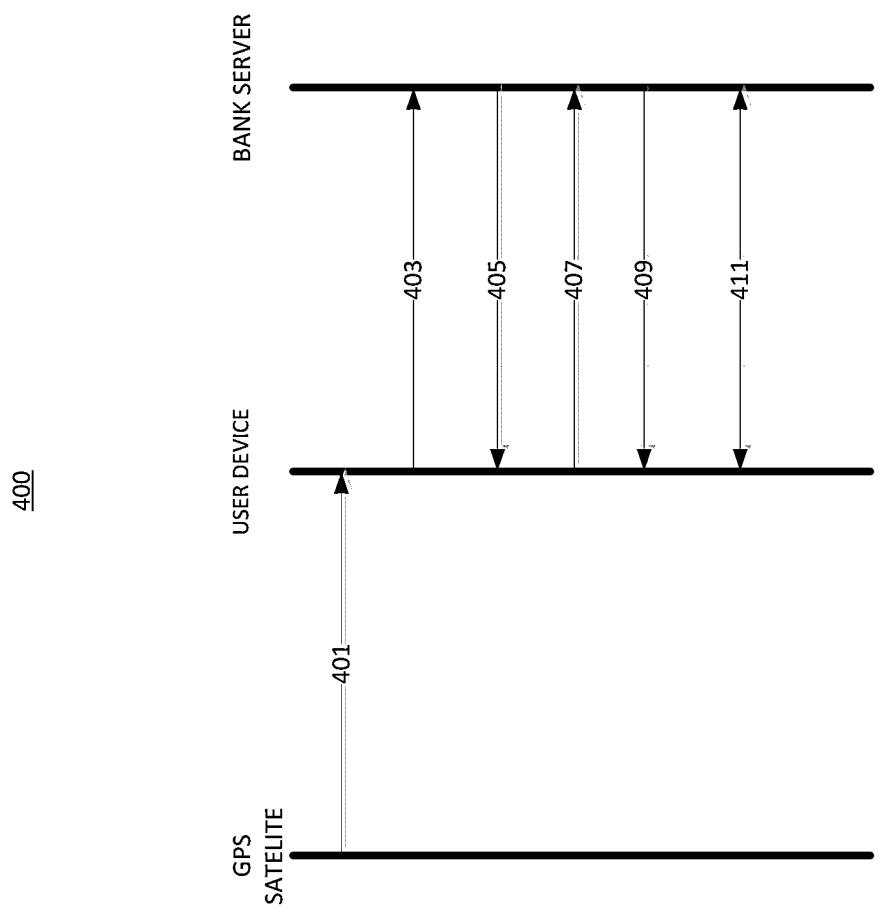
FIG. 4 is a flow diagram illustrating the creation and use of a geolocation data using the user device to decrypt the PII and determine an authentication value.

FIG. 4 is a flow diagram 400 of an example and use of geolocation data using the user device 103 to decrypt the altered PII 201 and determine an authentication value 243. The GPS satellites 113 transmit data 401 used to triangulate a geolocation including longitude 205 and latitude 207 of the user device 103. The user device 103 encrypts the PII 201 to obscure its value and forwards 403 the altered PII 211 to the server 117 at Local Bank 107 requesting authentication. The server 117 stores the altered PII in the database 127 and then forwards 405 the altered PII 211 and previous altered PII (not shown) to the user device 103 where the authentication applet (not shown) decrypts the altered PII 211 and previous altered PII 212 to produce the PII 201 and the previous PII 231. The authentication applet (not shown) on the user device 103 produces 241 an authentication value 243. The user device 103 forwards 407 the authentication value (i.e. velocity) to the server 117 where the authentication module 121 compares the authentication value to a predefined value. The server 117 of the bank 107 determines that authentication value is within a predefined limit the authentication is forwarded 409 to the user device 103 and banking transactions 411 are allowed between user device 103 and server 103.

FIG. 5 is a flowchart 500 illustrating a method of authenticating a user device 103 associated with a user 101. The trusted third party 129 receives from an application provider (i.e. server 117), in response to a request for authentication from the user device 103, the request including an altered current personally identifiable information (PII) 211 and an altered previous PII 212, the application provider (i.e. server 117) is unable to reproduce a current PII 201 and a previous PII 231. Next the trusted third party 129 computes 241 an authentication value 243 based upon the altered current PII 211 and the altered previous PII 212. Next the trusted third party 129 forwards the authentication value 243 to the application provider (i.e. server 117), the application provider (i.e. server 117) authenticating the user 101 using user device 103 based upon the authentication value 243.

FIG. 6 is a flowchart 600 illustrating a user device 103 requesting authentication of a user 101. In a first step 601, the user device 103 produces PII 201 in response to a user 101 requesting authentication to use an application (i.e. banking application 119) of an application provider (i.e. server 117). At step 603, alter the PII 201 to obscure the PII 201 using an obscuring value (i.e. key 225 or offset 227) unique to each user device 103. At step 605, the user device 103 transmits a request for authentication including the altered PII 211 to an application provider (i.e. server 117), the application provider (i.e. server 117) stores the altered PII 211 with a previously stored instance of the altered PII 211, the application provider (i.e. server 117) unable to reproduce the PII 201 from the altered PII 211, the application provider (i.e. server 117) requests a trusted device 129 to produce an authentication value 243 based on the altered PII 211 and the previously stored instance of the altered PII 211. At step 607, the user device 103 receives from the application provider (i.e. server 117) an indication of authentication, the application provider (i.e. server 117) determining authentication based upon an authentication value 243 calculated on the trusted device 129.

While various embodiments of the present disclosure have been particularly shown and described, it will be understood by those skilled in the art that various changes in form and details may be made therein without departing from the spirit and scope of the present disclosure as defined by the appended claims.

For example, FIG. 1 discloses a client server relationship. In other embodiments the relationship could be peer-to-peer. Further, FIG. 1 discloses the system as using a program stored on a disc 137 loaded into memory 135 and executed by a processor 133. An alternative embodiment could be implemented by a circuit board.

What is claimed is:

1. A method of authenticating a user device associated with a user, the method comprising:
   receiving, from an application provider, in response to a request for authentication from the user device, the request including an altered current personally identifiable information (PII) and an altered previous PII, the application provider unable to reproduce a current PII and a previous PII;
   computing an authentication value based upon the altered current PII and the altered previous PII;
   forwarding the authentication value to the application provider, the application provider authenticating the user device based upon the authentication value;
   wherein computing the authentication value based upon the current original PII and the previous original PII includes:
      decrypting each of the altered current PII and the altered previous PII with an encryption key associated with the user device to produce an original value of each of the altered current PII and the altered previous PII;
   wherein decrypting each of the altered current PII and the altered previous PII with an encryption key associated with the user device includes:
      receiving a current one time password (OTP) value representing the altered current PII, and
      extracting a distance and direction from specified bits of the OTP value.

2. The method according to claim 1, wherein the original value of each of the altered current PII and the altered previous PII is a geo location and computing the authentication value includes:
   calculating a distance between each of the original value of the altered current PII and the original value of the altered previous PII.

3. The method according to claim 2, wherein computing the authentication value based upon the altered current PII and the altered previous PII includes:
   calculating a velocity based on the distance between each of the original value of the altered current PII and the original value of the altered previous PII and a time associated with each of the altered current PII and the altered previous PII.

4. The method according to claim 1, further including:
   storing the altered current PII, the altered current PII used as the previous PII in subsequent requests for authentication.

5. The method according to claim 1, wherein computing the authentication value includes:
   computing the authentication value on the user device.

6. The method according to claim 1, wherein computing the authentication value includes:
   computing the authentication value on a trusted third party remote from the application provider and the user device.

7. A method of authenticating a user device associated with a user, the method comprising:
   producing personally identifiable information (PII) in response to a user requesting authentication to use an application of an application provider;
   altering the PII to obscure the PII using an obscuring value unique to each user device;
   transmitting a request for authentication including the altered PII to an application provider, the application provider storing the altered PII with a previously stored instance of the altered PII, the application provider unable to reproduce the PII from the altered PII, the application provider requesting a trusted device to produce an authentication value based on the altered PII and the previously stored instance of the altered PII; and
   receiving from the application provider an indication of authentication, the application provider determining authentication based upon an authentication value calculated on the trusted device;
      wherein the altered PII is decrypted with an encryption key associated with the user device to produce an original value of the altered PII;
   wherein decrypting the altered PII with an encryption key associated with the user device includes:
      receiving a current one time password (OTP) value representing the altered current PII, and
      extracting a distance and direction from specified bits of the OTP value.

8. The method according to claim 7, wherein altering the PII to obscure the PII using an obscuring value unique to each user device includes:
   encrypting the PII, the obscuring value being an encryption key.

9. The method according to claim 7,
   wherein altering the PII to obscure the PII using an obscuring value unique to each user device includes:
      adding the obscuring value to the PII, the obscuring value being an offset and the PII being a geo location.

10. The method according to claim 7, wherein the authentication value calculated on the trusted device includes:
    computing the authentication value on the user device, the user device being the trusted device.

11. A system for authenticating a user, the system comprising:
    an application provider includes circuit constructed and arranged to receive from a user device, a request for authentication, the request for authentication includes an altered current personally identifiable information (PII), the application provider further constructed and arranged to store the altered current PII with altered previous PII previously transmitted from the user device, the application provider unable to reproduce a current PII from the altered current PII;
    a trusted party includes circuit constructed and arranged to receive from the application provider, the altered current PII and the altered previous PII, the trusted party further constructed and arranged to compute an authentication value based on the altered current PII and the altered previous PII and return the authentication value to the application provider;
    the application provider further constructed and arranged to authenticate the user based upon the authentication value returned by the trusted party;
    wherein the trusted party is further constructed and arranged to:
       decrypt each of the altered current PII and the altered previous PII with an encryption key associated with the user device to produce an original value of each of the altered current PII and the altered previous PII;
    wherein decrypting each of the altered current PII and the altered previous PII with an encryption key associated with the user device includes:
       receiving a current one time password (OTP) value representing the altered current PII, and
       extracting a distance and direction from specified bits of the OTP value.

12. The system according to claim 11, wherein the original value of each of the altered current PII and the altered previous PII is a geo location and computing the authentication value includes:
   calculating a distance between each of the original value of the altered current PII and the original value of the altered previous PII.

13. The system according to claim 12, wherein the trusted party is constructed and arranged to:
   calculate a velocity based on the distance between each of the original value of the altered current PII and the original value of the altered previous PII and a time associated with each of the altered current PII and the altered previous PII.

14. The system according to claim 11, wherein the trusted party is further constructed and arranged to:
   subtract from each of the altered current PII and the altered previous PII an offset amount associated with the user device to produce an original value of each of the altered current PII and the altered previous PII.

15. The system according to claim 14, wherein the original value of each of the altered current PII and the altered previous PII is a geo location and computing the authentication value includes:
   calculating a distance between each of the original value of the altered current PII and the original value of the altered previous PII.

16. The system according to claim 14, wherein the trusted party is constructed and arranged to:
   calculate a velocity based on the distance between each of the original value of the altered current PII and the original value of the altered previous PII and a time associated with each of the altered current PII and the altered previous PII.

17. The system according to claim 11, wherein the trusted party is the user device.

18. A computer program product having a non-transitory, computer-readable storage medium which stores instructions that, when executed by a controller, causes the controller to carry out a method of authenticating a user device associated with a user, the method comprising:
   receiving, from an application provider, in response to a request for authentication from the user device, the request including an altered current personally identifiable information (PII) and an altered previous PII, the application provider unable to reproduce a current PII and a previous PII;
   computing an authentication value based upon the altered current PII and the altered previous PII;
   forwarding the authentication value to the application provider, the application provider authenticating the user device based upon the authentication value;
   wherein computing the authentication value based upon the current original PII and the previous original PII includes:
      decrypting each of the altered current PII and the altered previous PII with an encryption key associated with the user device to produce an original value of each of the altered current PII and the altered previous PII;
   wherein decrypting each of the altered current PII and the altered previous PII with an encryption key associated with the user device includes:
      receiving a current one time password (OTP) value representing the altered current PII, and
      extracting a distance and direction from specified bits of the OTP value.

* * * * *